United States Patent [19]

Buck, Jr. et al.

[11] 4,211,817
[45] Jul. 8, 1980

[54] BONDED LAMINATED STRUCTURE AND METHOD FOR PRODUCING SUCH

[75] Inventors: George S. Buck, Jr.; R. G. Weyker, both of Memphis, Tenn.

[73] Assignee: Fiberlok, Inc., Memphis, Tenn.

[21] Appl. No.: 911,536

[22] Filed: Jun. 1, 1978

[51] Int. Cl.² .......................... B32B 3/26; B32B 5/18
[52] U.S. Cl. ............................. 428/310; 156/283; 156/204; 156/308.2; 156/320; 428/311; 428/315
[58] Field of Search ...................... 156/283, 306, 320; 428/284, 310, 311, 315, 327, 283, 286, 301, 302

[56] References Cited

U.S. PATENT DOCUMENTS

| 3,072,582 | 1/1963 | Frost | 260/33.6 UB |
| 3,535,196 | 10/1970 | Laberinti et al. | 428/320 |
| 3,635,786 | 1/1972 | Hughes | 428/310 |
| 3,993,518 | 11/1976 | Buck, Jr. et al. | 428/283 |

Primary Examiner—William J. Van Balen
Attorney, Agent, or Firm—Quaintance, Murphy & Richardson

[57] ABSTRACT

A process for producing a bonded laminated flexible structure by forming a thin web of fibers and then contacting the web with particles of a copolymer of vinyl chloride and vinylidene chloride and contacting the batt with a sheet of cellular material; subsequently heating the unbonded structure and further compressing the unbonded structure to form the bonded laminated flexible structure.

20 Claims, 7 Drawing Figures

BONDED LAMINATED STRUCTURE AND METHOD FOR PRODUCING SUCH

Composite flexible structures are highly desirable for use in upholstery and bedding. In both upholstered furniture and mattresses one finds a firm, strong pad placed adjacent to the springs. This acts as an insulator which prevents the springs from abrading the soft filler cushion, and helps to distribute the weight of the springs evenly so that the occupant does not feel the outline of the spring element. In most upholstered furniture and mattresses one or more relatively soft pads are positioned on top of the insulator pad and beneath the ticking. This filler material is usually unbonded cotton, resin bonded polyester or polyurethane foam. Combinations of these materials are often used. Bonded cushioning of the type produced as per U.S. pat. No. 4,047,991 is ideally suited for mattress manufacture. However, the polyester shoddy employed is invariably dyed or pigmented, usually to dark colors. The dark colored batting tends to show through light colored mattress ticking, and this is undesirable. The present invention provides for the application of a very thin layer of almost white polyurethane foam to one surface of the cushioning, thereby eliminating this difficulty. The present invention also provides for the manufacture of a variety of bonded laminated structures, such as a combination insulator-filler topped with a thin layer of polyurethane foam. Combination batts of this type greatly reduce the labor required to assemble a mattress. A bonded laminated flexible structure also permits a significant reduction in the amount of polyurethane foam normally used, thereby greatly reducing the "bottoming" characteristic of relatively thick layers of foam. "Bottoming" is described as follows: The compressive deformation of foam increases approximately linearly with each increment of load until the critical range is reached, at which point an additional load increment causes a much larger change in the deformation than previously. This bottoming characteristic of flexible foam is undesirable. For instance, if a person should load a mattress or cushioning centrally by sitting on just a portion of it, the increased load per unit area frequently causes a deformation extended into the critical range. The cushioning compresses or collapses under the person and the ends of the cushion tend to rise up. Additionally, it is desirable to have a composite flexible structure which is flame-retardant. However, it is well known that most cellular materials are not flame-retardant, particularly the polyurethane which is a favorite in upholstery and mattress use, and it is necessary to surround the cellular materials with insulating material when a flame-retardant composite structure is required or to treat the cellular material with flame-retardant compositions.

In the prior art, laminated flexible structures of cellular material and batts have had to be stitched as shown in U.S. Pat. No. 3,451,885 or a suitable adhesive material applied to the two layers must be found as in U.S. Pat. No. 3,635,786. Generally, it has not been easy to handle the separate components, particularly for upholstery uses. Also, special treatment of the cellular material to reduce flammability is cumbersome and costly.

It is, therefore, an object of the present invention to provide a method for producing a bonded laminated flexible structure which is flame-retardant.

Yet another object is to provide a bonded laminated flexible structure which is firmly adhered without the addition of adhesive material.

Another object is to provide a bonded laminated structure of a controlled thickness.

Yet another object is to provide a light-colored bonded laminated structure which is suitable for use in upholstery.

Additional objects and advantages of the present invention will be apparent to those skilled in the art by reference to the following detailed descriptions and drawings wherein.

Figure 1:
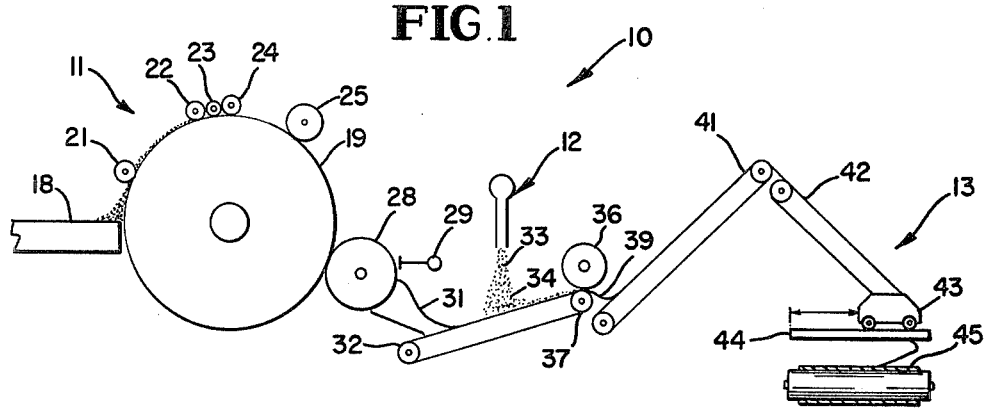
FIG. 1 is an elevation view of an apparatus suitable for practicing the process of the present invention.

The above and other objects are accomplished according to the present invention by providing a process comprising the steps of:

forming a thin web of fibers;

contacting the web with an adhesive amount of particles of a copolymer of vinyl chloride and vinylidene chloride;

forming the web into a batt by laying the web transversely back and forth such that the batt comprises a plurality of webs;

contacting the batt with a sheet of cellular material to form an unbonded structure;

heating the unbonded structure to a temperature above the sticking point of the copolymer to form a laminated structure;

compressing the laminated structure to form a bonded laminated flexible structure.

A thorough description of producing the cotton batts suitable for use in the present invention can be found in U.S. Pat. No. 3,993,518. Other fibers such as polyester and blends of cotton and polyester are also useful in the present invention. The thin web is generally from 1 to 200 and preferably from 1 to 100 fibers thick.

The copolymer generally has a weight ratio of vinyl chloride to vinylidene chloride of 1:99 to 40:60 and preferably 5:95 to 25:75. At higher ratios, the copolymer exhibits no properties not separately obtained by the use of a homopolymer of vinyl chloride. Likewise, at lower ratios, the use of the copolymer gives no advantages not achieved by the use of pure vinylidene chloride. The copolymer is applied to the web in an amount sufficient to function as an adhesive and generally in a weight ratio of the copolymer to the fiber of 1:99 to 40:60 and preferably 5:95 to 30:70. The copolymer particles generally have a size range of from 1 to 200 microns. Smaller sizes are useful technologically but are expensive to produce. Larger sizes not only unnecessarily increase the weight of the resultant batt but also reduce the number of cross-links possible with a given weight of copolymer which reduces bonding efficiency and strength. Copolymers useful in the present invention have a sticking point of from 300° to 370° F. All copolymers of vinyl chloride and vinylidene chloride useful in the present invention either have this property or can be modified to produce this property according to techniques well-known in the art which form no part of the present invention. Copolymers useful in the present invention are available from the Dow Chemical Company, Midland, MI, under the following trademarks: Saran Resin XP-5230.04, Saran Resin XP-2384.49, Saran Resin XP-4174.19, Saran Resin XP-5230.05, Saran Resin XP-5230.06, and Saran Resin XP-5230.08.

The cellular material may be any flexible foam such as rubber latex, synthetic rubber, polyurethane, etc. Polyurethane is preferred. Perferably the polyurethane has a density of 0.5 to 5 lbs/ft$^3$, is open celled and has a thickness of $\frac{1}{8}$ to 4 inches. Because the inventive process permits the use of sheets of ready-made cellular material and does not require foaming in situ, a great variety of ready-made material is available for use in this invention. An interesting aspect of the invention is the ability to control the thickness of the bonded laminated flexible structure. Surprisingly, it has been found that in this laminating process the fibrous batt can be greatly compressed while the cellular material is not. By suitable selection of the thickness of the cellular material and choice of the thickness of the batt formed, the thickness of the final bonded laminated flexible structure can be controlled. For use in upholstery, cellular material of $\frac{1}{2}$ to 1 inch thickness is preferred. If a structure with one cellular layer and one fibrous layer is desired and fibrous material generally has a thickness of 2 to 4 inches before compression. The compression can be so controlled as to yield a final bonded laminated flexible structure which is 20 to 90% of the total thicknesses of the unbonded structure. It can be readily appreciated that the criteria can easily be changed to produce carpeting underlay, and pads designed for other specific uses.

In the broadest aspect of the present invention any suitable device can be employed to control the rate of addition of the copolymer to the web.

The batt may be formed onto a suitable sheet of cellular material or the cellular material may be placed on top of the formed battt producing the unbonded laminated structure. The cellular material is superimposed onto the batt so as to completely cover the batt and be contiguous with the batt.

After the copolymer is contacted with the web, the web is formed into a batt. It is impractical to contact the copolymer with the preformed batt since it is difficult or impossible to insure penetration of the particles into the batt. As used herein, a batt is meant to refer to a plurality of webs.

The unbonded laminated structure formed as described above, is then heated to a temperature above the sticking point of the copolymer but below the degradation point of the fiber and generally at a temperature of 300° to 450° F. and preferably at 350° to 425° F. At much lower temperatures, the copolymer does not melt whereas at high temperatures, the fibers may be adversely affected. The heating is conducted for a time sufficient to effect the desired melting of the copolymer which generally occurs within a period of from 1 to 20 minutes and preferably within a period of between 2 and 10 minutes. Subsequently the bonded laminated flexible structure is cooled.

Figure 2:
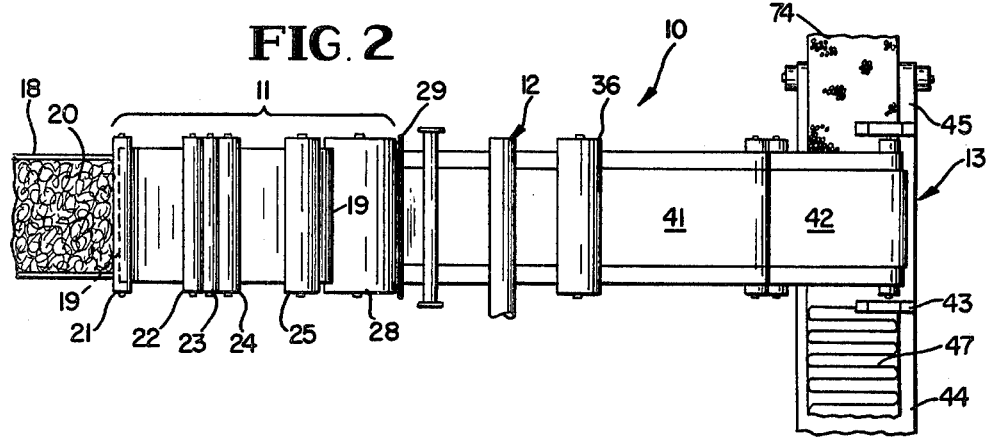
FIG. 2 is a plan view of the apparatus of FIG. 1.
Figure 3:
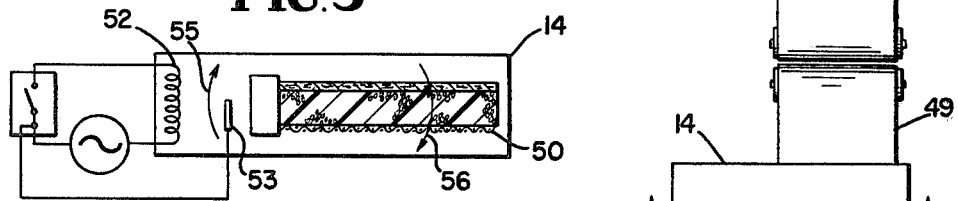
FIG. 3 is a sectional view taken along Line 3—3 of FIG. 2.
Figure 4:
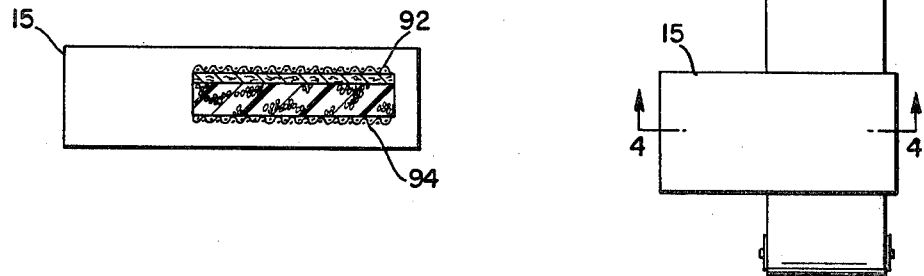
FIG. 4 is a sectional view taken along Line 4—4 of FIG. 2.

Referring now to the drawings and in particular to FIG. 1, there is shown an apparatus 10 useful for practicing the process of the present invention. The apparatus 10 comprises an opener or a garnet 11, a particle dispenser 12, a reciprocating means or "camel-back" lapper 13 and, as shown in FIG. 2, an oven 14. The garnet 11 comprises an inlet chute 18 adapted to feed bulk fibers to the rotating drum 19 of the garnet 11. The garnet 11 is also provided with a plurality of tooth rolls 21, 22, 23, 24, 25 which together with the teeth not shown on the drum 19 take bulk fibers 20 and convert them to a web which adheres to the drum 19. The web adhering to the drum 19 is transferred to the drum 28 where it is removed by a comb 29. The web 31 that is now only between 1 and 100 fibers thick and is barely self-supporting drops to conveyor 32 where it passes under the particle dispenser 12. While on the conveyor 32 and supported thereby, the web 31 is contacted with particles 33, 34 which fall from the particle dispenser 12 under the influence of gravity. By virtue of the fact that the web 31 is supported on the conveyor 32, the particles 33, 34 do not pass through the web 31 but rather are retained by it. To further insure retention by the web 31 of the particles 33, 34, the web 31 is passes between the nip of two rotating rolls 36, 37; the lower roll performing the dual function of providing a support for the conveyor 32. The web 39 then goes to the conveyor 41 and thence to the conveyor 42. In a manner well known in the art, the lower end of the conveyor 42 is attached to a traveller 43 which moves back and forth on the track 44. The conveyor 42 is positioned above and at right angles to the conveyor 45. The apparatus is adjusted such that the speed of the conveyor 42 is several times faster than the speed of the conveyor 45. By virtue of this arrangement, the web 39 is reciprocatively cross-laid back and forth on the conveyor 45 thus forming an unheat-treated batt 47. A sheet of cellular material 74 is placed on top of the unheat-treated batt 47. Alternatively, the unheat-treated batt 47 may be cross-laid onto the preformed cellular sheet 74. The unheat-treated batt 47 plus cellular material 74 passes through an oven 14 on foraminous belt 50 (see FIG. 3). As shown in FIG. 3, the oven 14 is provided with heating means 52 which can be thermostatically controlled by a thermostat 53. The oven 14 is also provided with air circulating means not shown that causes the air to circulate in the direction shown by the arrows 55 and 56. After the batt 47 and cellular material 74 have been bonded by the heat in the oven, they are passed through cooling unit 15 which is equipped with foraminous belts 92 and 94 as shown in FIG. 4 between which the bonded batt and cellular material pass, and compression takes place. The resultant product is the bonded, laminated flexible structure.

Figure 5:
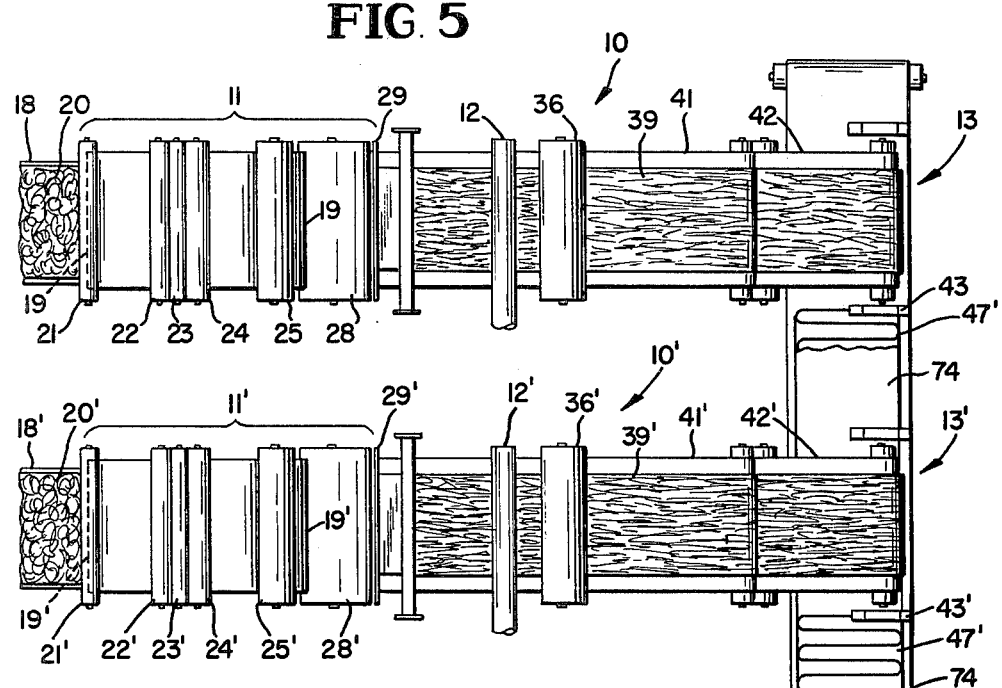
FIG. 5 is a plan view of an apparatus suitable for practicing the process of the present invention including a plurality of web-producing means for producing a web of fibers dusted with a particulate copolymer.

As shown in FIG. 5, a plurality of web-producing means 10 and 10' produce layers 47 and 47' respectively on the single conveyor 45. While only two web-producing means 10 and 10' are shown in FIG. 4, it is to be understood that additional web-producing means could be added for producing a layered composite batt comprising more than two layers. In each web-producing means, the primed and unprimed arabic numerals refer to equivalent elements preforming substantially the same function with such minor variations as may be demanded by the particular choice of fibers and copolymers used. Theses functions are the same as those described in FIGS. 1–4. In FIG. 5 the cellular material 74 is placed on top of the web 47. As this unbonded laminate structure of web 47 and cellular material 74 passes under web-producing means 10' at conveyor 42' a second web 47' is layered onto the unbonded laminated structure of web 47 and cellular material 74. The three layer structure of webs 47 and 47' with cellular material 74 therebetween goes via conveyor 49 to oven 14 and cooler 15 as previously described. The resultant product is a three layered bonded, laminated flexible structure.

Figure 6:
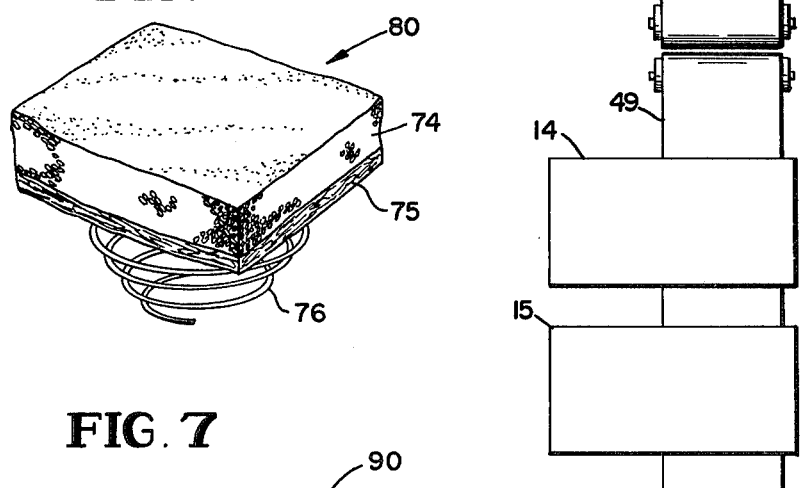
FIG. 6 is a diagrammatic view of a bonded laminated structure using a flame-retardant batt and a cellular material.

FIG. 6 is an illustration of a bonded laminated flexible structure 80 composed of two layers, a cellular layer 74 and a fibrous batt 75 on a spring 76.

Figure 7:
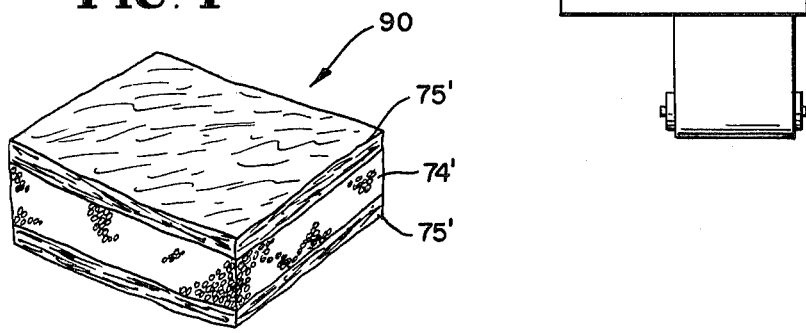
FIG. 7 is a diagrammatic view of a bonded laminated flexible structure using two fibrous batts with a cellular material therebetween.

FIG. 7 is an illustration of a bonded laminated flexible structure 90 composed of three layers, a cellular layer 74' and two fibrous batt layers 75' produced according to FIG. 5.

The invention may be understood by reference to the following non-limiting examples. These examples are designed to teach those skilled in the art how to practice the invention and represent the best mode contemplated for practicing the invention. Unless otherwise specified, all parts and precentages are by weight.

EXAMPLE 1

A copolymer of vinyl chloride and vinylidene chloride available from the Dow Chemical Company, Midland, Mich., under the designation XP-5230.04 is added to a 50/50 cotton/polyester web in the manner described with respect to the drawings. A sheet of polyurethane foam, ½"×80"×100' open celled, density of 1.56 lbs/ft.$^3$ is placed onto conveyor 45 and the batt layered onto the foam sheet. The unbonded structure has a thickness of 3 inches. This unbonded structure is passed through oven 14 at 410° F. and cooled and compressed in apparatus 15. The thickness of the bonded laminated flexible structure is 1⅛ inches. This structure can take a load of 0.5 lbs/in with a percent deflection of 24.7. A polyurethane foam of comparable thickness will have a deflection of 40%.

EXAMPLE 2

The same copolymer used in Example 1 was used to produce two batts in accordance with FIG. 5. A sheet of polyurethane foam, ½×80"×100', open celled, density of 1.8 lbs/in. was placed between the two batts so that it was contiguous with the inner faces of the two batts and the same size. The thickness of the unbonded structure was 3½ inches. After heating, cooling and compression, the thickness of the bonded structure was 1¼ inches. This structure passes the California flame-retardance test for upholstery filling material.

What is claimed is:

1. A dry process for producing a bonded laminated flexible structure comprising the steps of:
   I. forming a thin web of fibers;
   II. Contacting the web with an adhesive amount of particles of the copolymer of vinyl chloride and vinylidene chloride;
   III. forming the web into a batt by laying the web transversely back and forth such that the batt comprises a plurality of webs;
   IV. contacting the batt with a sheet of cellular material to form an unbonded structure;
   V. heating the unbonded structure to a temperature above the sticking point of the copolymer but below the degradation temperature of the fiber to form a laminated structure;
   VI. compressing the laminated structure to form a bonded laminated flexible structure.

2. The process of claim 1 wherein the forming of the web into the batt is done onto the cellular material.

3. A process of claim 1 for producing a flame-retardant laminated structure comprising the steps of:
   I. forming a first batt composed of fibers formed into a web and contacted with a copolymer;
   II. contacting the batt with a sheet of cellular material to form an unbonded structure;
   III. forming a second batt composed of fibers formed into a web and contacted with a copolymer onto the cellular material of the unbonded structure to form a further unbonded structure;
   IV. heating the further unbonded structure to a temperature above the sticking point of the copolymer but below the degradation temperature of the fibers to form a laminated structure;
   V. compressing the laminated structure to form a bonded laminated flexible stucture.

4. The process of claim 1 where the steps are practiced in the order recited.

5. The process of claim 1 wherein the particles have a size range of 1 to 200 microns.

6. The process of claim 1 wherein the weight ratio of vinyl chloride to vinylidene chloride is 5:95 to 25:75.

7. The process of claim 1 wherein the weight ratio of copolymer to fiber is 5:95 to 30:70.

8. The process of claim 1 wherein the cellular material is polyurethane foam.

9. The process of claim 1 wherein the fiber is cotton and polyester blend.

10. The process of claim 1 wherein the fiber is all polyester.

11. A completely dry process for producing a flame-retardant bonded laminated flexible structure comprising the steps of:
   I. forming a horizontally disposed, thin, planar web of fibers, said web being from 1 to 200 fibers thick;
   II. contacting the web with particles of a copolymer of vinyl chloride and vinylidene chloride while the web is in contact with and supported by a moving belt thereby inhibiting the passage of particles through the web;
      A. wherein the weight ratio of vinyl chloride to vinylidene chloride is 5:95 to 25:75,
      B. wherein the weight ration of copolymer to the fiber is 5:95 to 30:70,
      C. wherein the copolymer particles have a size range of 1 to 200 microns,
      D. wherein the copolymer has a sticking point of 300° to 370° F.;
   III. forming the web into a batt by laying the web transversely back and forth on a moving belt such that the batt comprises a plurality of webs;
   IV. joining the batt with a sheet of polyurethane foam to form an unbonded structure wherein the polyurethane foam has a thickness of ⅛ inch to 4 inches, is open celled, and has a density of 0.5 to 5 lbs/ft.$^3$.
   V. heating the batt to a temperature of 350° to 425° F. for a period of 2 to 10 minutes while the batt is being passed through an oven on a foraminous belt while hot air is forced through the belt and through the batt to form a laminated structure;
   VI. passing the laminated structure between two foraminous belts while simultaneously blowing cooling air wherein the laminated structure is reduced in thickness to 20 to 90% of the thickness of the original structure to form a bonded laminated flexible structure.

12. A process of claim 11 wherein the web is formed into a batt onto the sheet of polyurethane foam.

13. A bonded laminated flexible structure consisting essentially of fibers contacted with a copolymer of vinyl chloride and vinylidene chloride formed into a batt and a cellular material strongly adhered to the batt by means of first heating to the melting point of the copolymer and then compressing the batt and cellular material to form an adhered structure.

14. A product of claim 13 wherein the cellular material is open celled.

15. A product of claim 13 wherein the cellular material has a density of 0.5 to 5 lbs/ft$^3$.

16. A product of claim 13 wherein the fiber is a blend of cotton and polyester is a weight ratio of 10:90 to 90:10.

17. A product of claim 13 wherein the cellular material is polyurethane foam.

18. A bonded laminate flexible structure consisting essentially of a batt of fibers formed with a copolymer of vinyl chloride and vinylidene chloride and a cellular material of polyurethane foam strongly adhered to the batt by means of first heating to the melting point of the copolymer and then compressing the batt and foam together to form an adhered structure.

19. A bonded laminated flexible structure consisting essentially of fibers bonded solely by a dry powder copolymer of vinyl chloride and vinylidene chloride formed into a cross-lapped batt and a cellular material of polyurethane foam strongly and solely adhered to the batt by the same copolymer.

20. A bonded laminated flexible structure consisting essentially of fibers bonded together with a copolymer of vinyl chloride and vinylidene chloride formed into a batt and a cellular material adhered to the batt by the same copolymer.

* * * * *